(12) United States Patent
Meyer

(10) Patent No.: US 7,369,369 B1
(45) Date of Patent: *May 6, 2008

(54) BIDIRECTIONAL MICROPOSITIONING RECORDING HEAD FOR A MAGNETIC STORAGE DEVICE

(76) Inventor: Dallas W. Meyer, 4130 Sugar Maple Dr., Danville, CA (US) 94506

( * ) Notice: Subject to any disclaimer, the term of this patent is extended or adjusted under 35 U.S.C. 154(b) by 450 days.

This patent is subject to a terminal disclaimer.

(21) Appl. No.: 10/818,641

(22) Filed: Apr. 5, 2004

Related U.S. Application Data

(60) Provisional application No. 60/460,785, filed on Apr. 3, 2003.

(51) Int. Cl.
*G11B 21/24* (2006.01)
*G11B 5/60* (2006.01)

(52) U.S. Cl. .................. 360/294.5; 360/294.7
(58) Field of Classification Search ............. 360/294.5, 360/294.3, 294.7, 240, 234.7
See application file for complete search history.

(56) References Cited

U.S. PATENT DOCUMENTS

| | | | | |
|---|---|---|---|---|
| 5,060,210 | A | 10/1991 | Fennema et al. | 369/30.15 |
| 5,521,778 | A | 5/1996 | Boutaghou et al. | 360/264.5 |
| 6,078,468 | A | 6/2000 | Fiske | 360/97.01 |
| 6,101,058 | A | 8/2000 | Morris | 360/69 |
| 6,262,868 | B1 | 7/2001 | Arya et al. | 360/290 |
| 6,414,827 | B1 | 7/2002 | Young et al. | 360/78.09 |
| 6,421,211 | B1 | 7/2002 | Hawwa et al. | 360/294.4 |
| 6,452,755 | B2 | 9/2002 | Bonin | 360/294.6 |
| 6,469,859 | B1 | 10/2002 | Chainer et al. | 360/75 |
| 6,487,045 | B1 * | 11/2002 | Yanagisawa | 360/236.5 |
| 6,490,118 | B1 | 12/2002 | Ell et al. | 360/77.04 |

(Continued)

OTHER PUBLICATIONS

Co-pending U.S. Patent Application to Dallas W. Meyer, U.S. Appl. No. 10/342,920, filed Jan. 13, 2003 (54 pages), and 17 sheets of accompanying drawings. Note: In an Office Action mailed in this case on Jun. 14, 2004, claims 1, 4, 12, 13, 24, and 31 were rejected under 35 U.S.C. § 102(e) by U.S. Patent No. 6,600,634 to Kim, et al., claims 1-3, 7, 10, 12, 13, 16, 17, 24, 25, 29, 31-33, and 35-38, were rejected under 35 U.S.C. § 102(e) by U.S. Patent No. 6,611,399 to Mei, et al, and claims 14, 15 were rejected under 35 U.S.C. § 103(a) by Mei.

(Continued)

*Primary Examiner*—Julie Anne Watko
(74) *Attorney, Agent, or Firm*—Workman Nydegger

(57) ABSTRACT

A recording head for use in magnetic storage devices is disclosed. The recording head includes a transducer that is bi-directionally movable with respect to a magnetic medium surface of the magnetic storage medium, thereby enabling improved positioning of the transducer during read and write operations of the transducer. The recording head further includes a wafer assembly having a motor segment and a flexure segment that are joined together. The flexure segment includes a cavity that receives the transducer therein. The recording head further includes a slider body that receives the wafer assembly in a cavity defined therein. A motor located in the motor segment can be selectively actuated to cause movement of the flexure assembly and corresponding movement of the transducer body. Various features regarding the construction and assembly of the recording head are also disclosed to improve head operation, including techniques for preventing head damage during a shock event.

24 Claims, 13 Drawing Sheets

U.S. PATENT DOCUMENTS

| | | |
|---|---|---|
| 6,493,177 B1 | 12/2002 | Ell et al. ................. 360/78.05 |
| 6,501,623 B1 | 12/2002 | Sassolini et al. ......... 360/245.3 |
| 6,535,360 B1 | 3/2003 | Kim et al. ............... 360/294.3 |
| 6,542,281 B2 | 4/2003 | Feldman et al. ............ 359/280 |
| 6,545,970 B2 | 4/2003 | Durnin et al. ......... 369/112.24 |
| 6,547,975 B1 | 4/2003 | Kobrin ....................... 216/22 |
| 6,556,380 B2 | 4/2003 | Bunch et al. ............ 360/235.1 |
| 6,563,665 B1 | 5/2003 | Ell ........................ 360/78.05 |
| 6,594,119 B1 | 7/2003 | Koshikawa et al. ..... 306/294.3 |
| 6,600,619 B1 | 7/2003 | Morris et al. ................ 360/75 |
| 6,600,634 B1 | 7/2003 | Kim et al. ............... 360/294.5 |
| 6,611,399 B1 | 8/2003 | Mei et al. ................ 360/234.7 |
| 6,633,451 B1 | 10/2003 | Chainer et al. ................ 360/75 |
| 6,697,232 B1* | 2/2004 | Hipwell et al. ........... 360/294.5 |
| 6,747,836 B2 | 6/2004 | Stevens et al. .......... 360/78.05 |
| 6,768,610 B1 | 7/2004 | Morris et al. ............ 360/78.07 |
| 2002/0101129 A1* | 8/2002 | Grade et al. ................ 310/309 |
| 2003/0093894 A1 | 5/2003 | Dugas et al. ............ 29/603.15 |
| 2003/0161061 A1 | 8/2003 | Lamberts ..................... 360/31 |
| 2003/0197969 A1 | 10/2003 | Szita et al. .............. 360/77.08 |

OTHER PUBLICATIONS

Co-pending U.S. Patent Application to Dallas W. Meyer, U.S. Appl. No. 10/342,615, filed Jan. 13, 2003 (43 pages), and 7 sheets of accompanying drawings. Note: In an Office Action mailed in this case on Aug. 25, 2004, claims 1-34 were rejected under 35 U.S.C. § 102(e) by U.S. Patent No. 6,768,010 to Morris, et al., and claims 35-42 were rejected under 35 U.S.C. § 103(a) by Morris, et al. in view of U.S. Patent No. 6,078,468 to Fiske.

Co-pending U.S. Appl. No. 10/794,482, to Dallas W. Meyer, filed Mar. 5, 2004.

Co-pending U.S. Appl. No. 10/900,713, to Dallas W. Meyer, filed Jul. 27, 2004.

\* cited by examiner

BIDIRECTIONAL MICROPOSITIONING RECORDING HEAD FOR A MAGNETIC STORAGE DEVICE

CROSS-REFERENCE TO RELATED APPLICATIONS

This application claims the benefit of U.S. Provisional Patent Application Ser. No. 60/460,785, filed Apr. 3, 2003, entitled "Structural and Processing Features of Integrated Recording Head Micropositioner," which is incorporated herein by reference.

BACKGROUND

1. The Field of the Invention

The present invention generally relates to data storage on rotating magnetic storage devices. More specifically, the present invention relates to a rotating magnetic storage device having a recording head that is bi-directionally controlled using off-axis flexure bending.

2. The Related Technology

During recent years, there has been a steady improvement in the volume of data that can be stored on magnetic storage media, such as hard disk drives used in computers. Today, a single 3.5 inch magnetic storage disk can store twenty gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid-state devices, drive arrays (RAID), single rotating magnetic disk drives, and removable optical media. FIG. 13 is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 13, however, the performance of single rotating magnetic storage devices is increasing less rapidly than the performance of RAID and solid-state devices.

Although magnetic storage devices are widely used and have become significantly less expensive during recent years, a number of technological hurdles have been encountered, which threaten to reduce the rate at which future improvements in cost and performance will occur. FIG. 14 is a perspective view of a conventional magnetic storage device. Magnetic disk drive 10 includes a rotating magnetic storage medium 12 that, as mentioned above, can store tens of gigabytes of data in an area of only a few square inches. A head gimbal assembly 14 ("HGA") positions a recording head 16 with a transducer in close proximity to the surface of the magnetic storage medium 12 to enable data to be read from and written to the storage medium. An actuator assembly 18 rotates the HGA 14 during operation to position the transducer of the recording head 16 at the proper location over the rotating magnetic storage medium 12.

One of the most significant problems that have arisen in the effort to improve capacity and performance in magnetic storage devices is track following, or the ability to quickly and reliably position the transducer of the recording head 16 over the appropriate track on the magnetic storage medium 12. In conventional devices, the actuator assembly 18 includes a voice coil that uses a feedback loop based on servo tracks that are embedded between the data tracks on the magnetic storage medium 12. The track pitch (i.e., the spacing between adjacent tracks) of the storage medium 12 in conventional devices is as low as 0.2 microns. At such small track pitches, non-repeatable motions of the rotating magnetic storage medium 12, the HGA 14, and the other mechanical components of disk drive 10 make it increasingly difficult to reliably follow the data tracks on the magnetic storage medium. For example, in devices having an HGA 14 with a length of 1.5 inches to the recording head 16 and a track pitch of 0.2 microns, the angular position of the head gimbal assembly needs to have resolution better than 33 millionths of an arc second in order to adequately follow the tracks on the magnetic storage medium 12. Efforts to achieve adequate track following have included the use of smaller disks for high speed drives, fluid motors for improved damping, and active rotational feedback sensors using negative feedback algorithms. However, the use of such techniques can lead to either the loss of capacity or are only temporary solutions to this problem, as track pitches continue to decrease.

A closely related problem is that of the settling time and performance, which relates to the ability to stabilize the recording head over a track. The settling time is dictated by the inertial loads and the exciting resonant frequencies associated with the act of accessing a selected track, the amount of damping in the HGA 14, and the servo bandwidth. These factors are generally limited by the resonant frequencies in the arm of the HGA 14. Thus, settling times have not significantly improved in the last several generations of drives in view of the fundamental limitations on the mechanics of drives that use a recording head 16 controlled by an HGA 14 and an actuator assembly 18, as shown in FIG. 14.

As both the track pitch and the size of sector regions on the magnetic media used to physically record bits of data have decreased, transducers in disk drives have been required to be positioned closer to the surface of the magnetic storage device. A representation of the distance between the transducer and the surface of the magnetic storage medium, referred to as the fly height 22, is shown in FIG. 15. Current fly heights are now as small as 50 Angstroms (Å) in high capacity disk drives. The fly height is dictated by the fundamental resolution requirements associated with the magnetic storage device, which is a function of the track pitch and the size of the regions on which bits of data are physically recorded. If the fly height becomes too large during operation, the transducer becomes unable to resolve bits encoded in the storage medium. On the other hand, if the transducer is brought into physical contact with the optical storage medium, which can be traveling at speeds on the order of 100 miles per hour, both the transducer and the storage device can be damaged.

The fly height has been controlled in conventional devices by improving the manufacturing tolerances, by designing a highly rigid and dampened HGA 14, and by the use of air bearings associated with the recording heads 16. An air bearing is a cushion or layer of air that develops between the surface of the magnetic storage medium and the adjacent surface of the transducer as the storage medium moves underneath the transducer.

As noted above, as the fly heights required in magnetic storage devices have decreased, the problem of transducer damage from excessive media contact has become more pronounced. Current giant magnetoresistance ("GMR") and tunneling magnetoresistance ("TMR") transducer heads are sensitive to being damaged if excessive contact with the storage medium is experienced. One related problem is that conventional transducer designs often lead to thermal pole tip protrusion, which occurs when the transducer is heated and the tip, or pole, of the transducer extends and protrudes beyond the plane of the transducer. Thermal pole tip protrusion can aggravate the contact of the transducer with the storage medium and can lead to increased or more rapid damage of the transducer.

These problems currently facing the magnetic storage device industry threaten to impede the ongoing progress in reliability, performance, and cost that has been achieved during recent years. Although many of these problems can be overcome to some degree using conventional head gimbal assembly designs, it is unlikely that these problems can be successfully overcome while keeping costs for disk drive users down.

One approach that is currently being developed to lessen the effects of the challenges discussed above involves a technique called second stage actuation. Second stage actuation systems use a dual actuation method for controlling the horizontal tracking position of the head over a servo mark positioned on the surface of the storage medium. A coarse actuator, similar to a HGA, positions the recording head to a global position, and a fine actuator with a single, horizontal degree of freedom at the head positions the head and transducer to a fine position. While this technique can be adequately practiced in connection with previous versions of magnetic storage media, the increased density on newer discs requires closer tolerances on the fly height, as discussed above. As the fly heights of newer storage systems continually decrease, second stage actuation technology becomes increasingly inadequate, particularly in light of the fact that transducer positioning is limited to adjustment in only the horizontal direction.

Additionally, it is known that previous methods have been attempted to measure fly height of a recording head above the surface of a magnetic storage medium. These methods include calculations involving capacitance, ratios of certain harmonic amplitudes, and vibrational aspects of piezo-electric devices mounted on the recording head. However, these methods have proven inadequate in precisely controlling and calibrating fly height and other possible movements of the recording head in newer magnetic storage devices.

SUMMARY OF SELECTED EMBODIMENTS OF THE INVENTION

The present invention has been developed in response to the above and other needs in the art. Briefly summarized, embodiments of the present invention are generally directed to improving the performance and use of magnetic storage media, such as hard disk drives. More specifically, the present invention is directed to a rotating magnetic storage medium having a recording head that is bi-directionally controlled with respect to the surface of a magnetic medium. The recording head utilizes a dual-wafer design that incorporates a plurality of flexure structures. The flexure structures enable the bi-directional movement of the recording head during drive operation.

In one embodiment, a magnetic storage medium, such as a hard disk drive is disclosed. The hard disk drive includes a magnetic medium, such as a hard disk, that is accessed by a recording head. The recording head is supported by a head gimbal assembly having a macroactuator that is movable to coarsely position the recording head with respect to the surface of the magnetic medium.

The recording head is bi-directionally movable in order to precisely position a transducer of the recording head with respect to the magnetic medium surface. In one embodiment, this is achieved with a dual-wafer assembly that is included as a component of the recording head, together with a slider body portion.

The dual wafer assembly is interposed between the slider body and the transducer and generally includes a flexure segment and a motor segment. The flexure segment has a plurality of flexures that are arranged in a specified configuration so as to constrain possible movement of the flexure segment in specified directions when a force is applied to the flexures. In one embodiment, the force is provided by one or more electromagnetic assemblies positioned in the motor segment that is in turn attached to the flexure segment.

Additionally, the flexure segment includes a cavity in which a transducer body having a transducer is located. When the force is applied to the flexure segment by the electromagnetic assemblies of the motor segment, the flexures constrain motion of the transducer in desired directions with respect to the magnetic medium surface. Because of its attachment to the flexure segment, the transducer body is also moved, thereby positioning the transducer as desired with respect to the magnetic medium surface. For instance, the flexures can selectively enable vertical or horizontal transducer movement with respect to the magnetic medium surface, while minimizing movement in undesired directions.

In other embodiments, various methods and features are disclosed for the manufacture and improvement of operation of the recording head. These methods and features include various wafer-level techniques that improve recording head design and manufacture, precision assembly of the recording head, and head component surface treatment to minimize damage when the head undergoes a shock event. These features are especially useful for disk drives and other magnetic storage media that are employed in an environment where physical shock to the drive is likely to occur.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-15 depict various features of embodiments of the present invention, which is generally directed to structures and methods of manufacturing relating to a recording head that uses off-axis flexure bending to move a transducer with respect to a magnetic medium, such as a rotating disk, in a magnetic storage device. Examples of magnetic storage devices can include a hard disk drive used in one of a variety of electronic products. In particular, the structures and methods disclosed herein are preferably directed for use in a recording head having an integrated, bi-directional micropositioner. The micropositioner is configured to be selectively moved in two orthogonal directions with respect to the surface of the magnetic medium, thereby enabling greater precision in positioning a transducer located in the micropositioner near the magnetic medium surface.

An overview of the operation and calibration of recording heads having an integrated micropositioner is included in U.S. patent application Ser. No. 10/342,920, filed Jan. 13, 2003, entitled "Integrated Recording Head Micropositioner for Magnetic Storage Devices" ("the '920 application"), and U.S. patent application Ser. No. 10/775,406, filed Feb. 9, 2004, entitled "Method of Calibrating Magnetic Storage Medium Bi-Directional Recording Head" ("the '406 application"), which are incorporated herein by reference in their entirety.

Figure 14:
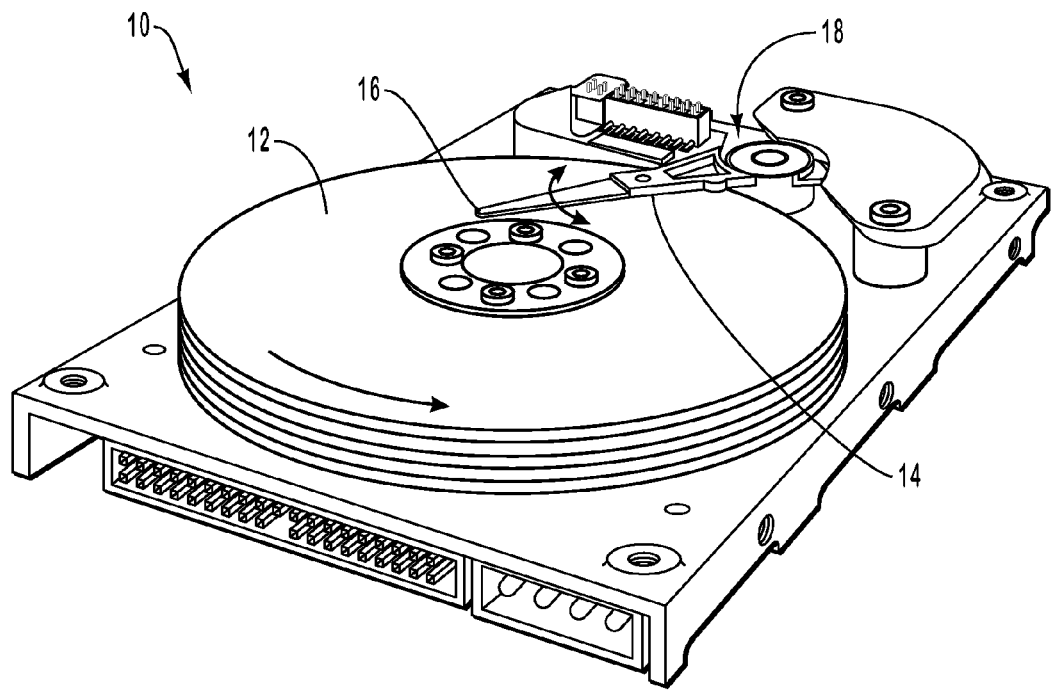
FIG. 14 is a perspective view of a conventional disk drive and head gimbal assembly.
Figure 15:
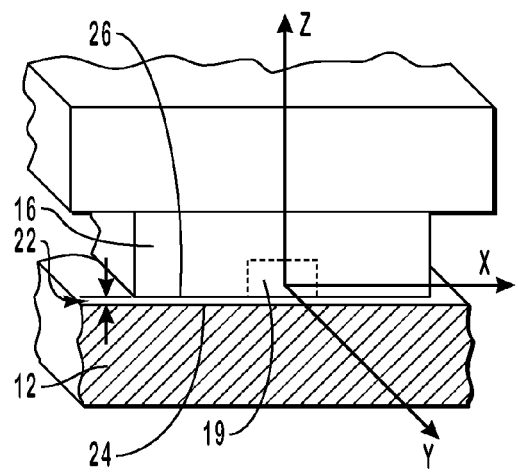
FIG. 15 is a perspective view of a recording head/magnetic storage medium interface of a conventional disk drive.

While FIGS. 14 and 15 illustrate conventional disk drives, these figures set forth a convention regarding a frame of reference that is useful in describing the methods of positioning and calibrating the transducers of the recording heads. As shown in FIG. 14, a rotating magnetic storage medium 12 rotates counterclockwise, such that elements on the storage medium that encode individual bits of data travel under the recording head 16 in a direction that is substantially parallel to the longitudinal axis of the arm of the head/gimbal assembly ("HGA") 14. In other words, a particular track of the magnetic storage medium 12, which is concentric with the circumference of the magnetic storage medium, is substantially tangent to the longitudinal axis of the HGA 14 when the track is positioned under recording head 16. This motion of the magnetic storage medium 12 with respect to the HGA 14 defines a trailing edge or surface of the recording head 16 that is distal from the axis of rotation of the HGA 14.

FIG. 15 is a perspective view of the recording head, and shows an elevation of the trailing surface of the recording head 16. In FIG. 15, the motion of the illustrated portion of the magnetic storage medium 12 during operation is generally in the y direction, while the orientation of the data tracks of this portion of the magnetic storage medium is likewise substantially in the y direction. As shown in FIG. 15, the z direction is defined to be perpendicular to the surface of the magnetic storage medium 12. The x direction is defined to be substantially perpendicular to or lateral with respect to the orientation of the tracks. In other words, motion in the x direction can cause the transducer to be laterally moved between tracks or to be centered over a track; thus movement in the x direction is known as track-to-track movement. Because of the small angles involved, the motion of the transducer can be considered to be a translation in the x direction, regardless of whether the motion is a result of the actuation of the micropositioner integrated into the slider body of the recording head 16 or motion associated with the rotation of the HGA 14 about the axis of rotation of the HGA 14. The y axis is defined to be perpendicular to both the x and z axes as shown in FIG. 15.

FIG. 15 also illustrates a fly height 22, which is defined to be the distance in the z direction between the surface 24 of the magnetic storage medium 12 and the adjacent bottom, or air bearing, surface 26 of the recording head transducer. FIG. 15 illustrates the general position of a transducer in region 19 and the relationship thereof to the x, y and z axes and the fly height 22.

The definitions and descriptions to track-to-track, fly height and related concepts as described above are applied in the following discussion in describing various features of embodiments of the present invention. Note that the principles of the present invention to be described below can be reliably used with existing recording media as well as with higher density recording media that will be developed in the future. Also, the discussion to follow focuses on the interaction of a recording head with a top surface of a magnetic storage medium. In other embodiments, however, it should be appreciated that magnetic storage devices having a plurality of recording heads operating in conjunction with a plurality of magnetic storage medium surfaces can also benefit from the present invention. Thus, the description contained herein is merely illustrative of the broader concepts encompassed by the present invention, and is not meant to limit the present invention in any way.

Reference is now made to FIGS. 1A-1E, which show a general representation of a micropositioning recording head according to one embodiment of the present invention. As such, the recording head to be described is merely exemplary of those recording heads that fit within the description herein, and is not meant to confine the invention to only the illustrated implementation. In particular, a recording head, generally depicted at 30, forms a component of a magnetic storage device, such as a hard disk drive (not shown) for use in reading and writing data to a magnetic medium. The recording head 30 of the present embodiment generally includes a slider body 32, a transducer body 42, and a wafer assembly 100. These components cooperate in providing bi-directional actuation of the recording head with respect to a surface 52 of a magnetic storage medium, shown in FIG. 1B. Each of these components, along with their interaction with respect to one another, is explained below.

Figure 1A:
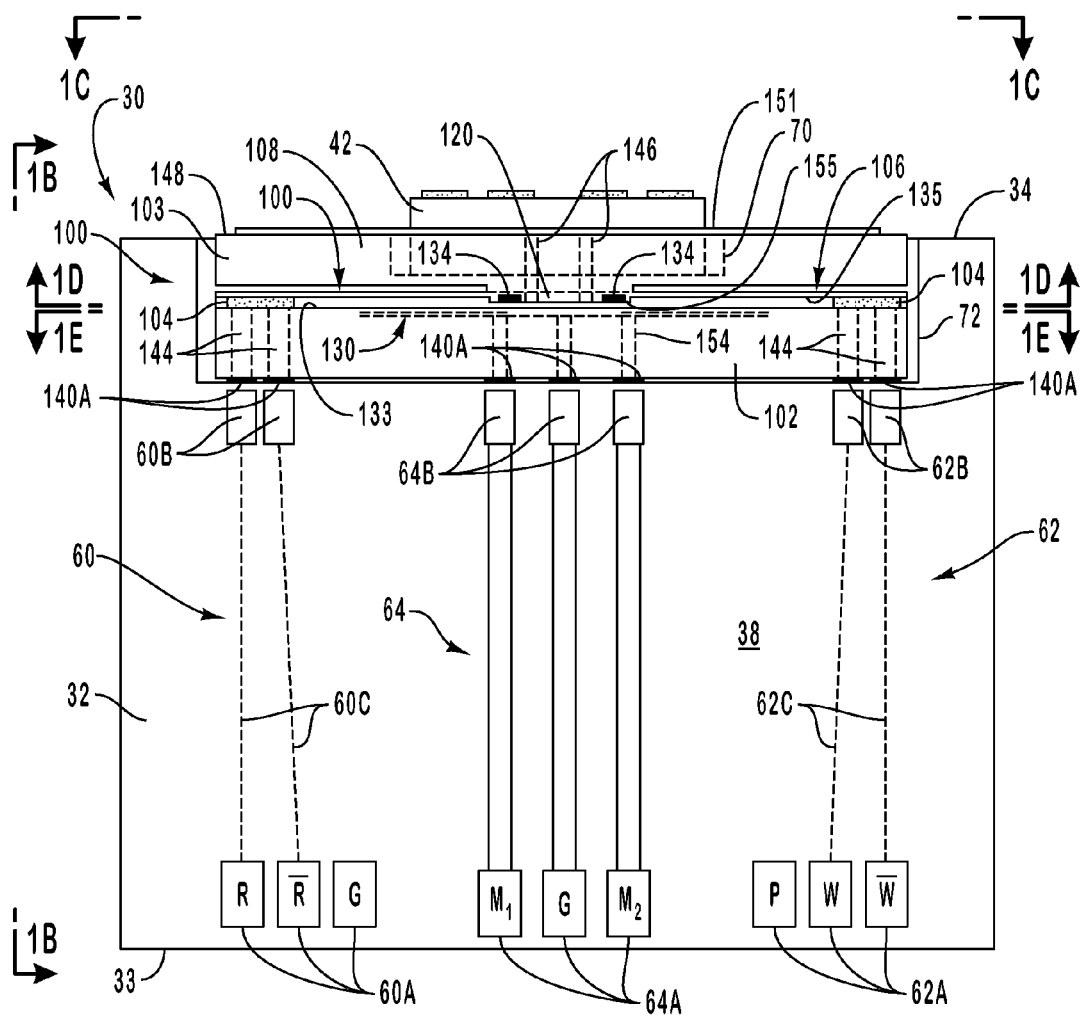
FIG. 1A is a top view of a recording head configured according to one embodiment of the present invention.
Figure 1B:
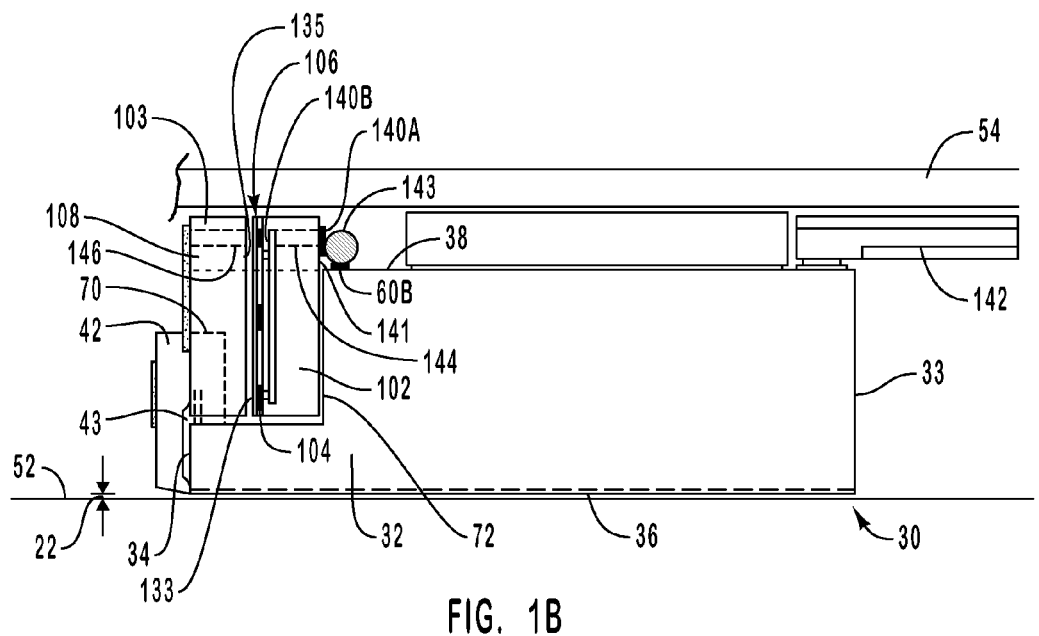
FIG. 1B is a side view of the recording head of FIG. 1A, taken along the line 1B-1B.

The slider body 32 includes a leading surface 33 and a trailing surface 34, as best shown in FIG. 1B. The slider body 32 is formed, for example, from alumina, alumina/TIC, another ceramic material, silicon, or silicon plus additional embedded circuitry. The slider body 32 has an air bearing surface 36, which, as shown in FIG. 1B, is positioned opposite a top surface 38. The air bearing surface 36 defines an air bearing plane and maintains an appropriate fly height 22 by the generation of an air bearing or air cushion between the air bearing surface and the adjacent surface 52 of the magnetic storage medium.

A portion of the top surface 38 of the slider body 32 is shown in FIG. 1B attached to a head gimbal assembly 54 to enable the recording head 30 to be macro-positioned with respect to the magnetic medium surface 52. Though not shown, the top surface 38 of the slider body 32 can include a plurality of integrated circuit structures and other components for use in connection with the recording head 30. For example, the top surface 38 of the slider body 32 can include pre-amplifier components for the read and write functions performed by a transducer 43 located in the transducer body 42.

Also included at or near the top surface 38 of the slider body 32 is a plurality of conductive pathways and leads for use in controlling various aspects of recording head operation. In detail, FIG. 1A shows a plurality of contact pads 60A and 60B pertaining to a plurality of read signal paths 60, a plurality of contact pads 62A and 62B pertaining to a plurality of write signal paths 62, and a plurality of motor assembly paths 64 on the slider body 32. The read and write signal paths 60 and 62 are used to provide and receive signals to and from the transducer of the transducer body 42 during operation, while the motor assembly signal paths 64 are used to control movement of the transducer body, as will be described.

As shown, the transducer body 42 includes the transducer 43 that serves as a read/write component for the recording head 30 to read data from and record data to the magnetic storage medium surface 52. The transducer body 42, which can be formed of an aluminum-titanium-carbide alloy or other suitable material, is positioned within a cavity 70 that is defined by both the wafer assembly 100 and a portion of the slider body 32. So positioned, the transducer body 42, and thus the transducer 43, can be bi-directionally moved with respect to the magnetic medium surface 52, as explained further below.

Figure 1C:
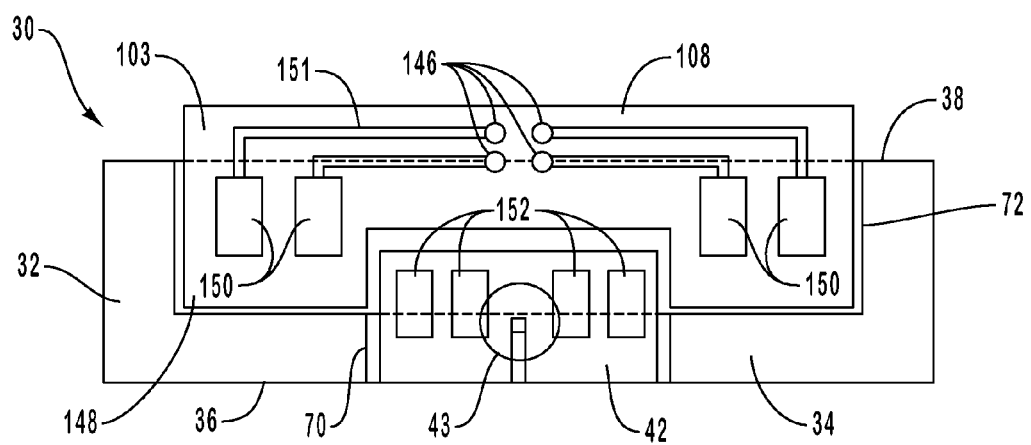
FIG. 1C is an end view of the recording head of FIG. 1A, taken along the line 1C-1C.

The wafer assembly 100 is interposed between the slider body 32 and the transducer body 42 and serves as a means by which the transducer 43 can be bi-directionally moved with respect to the magnetic medium surface 52. As such, a portion of the wafer assembly 100 in one embodiment is positioned in a cavity 72 defined by the slider body 32. This configuration places the transducer body 42, which is attached to the wafer assembly, near the trailing surface 34 of the slider body, as best shown in FIG. 1C.

The wafer assembly 100 generally includes two portions: a motor segment 102 and a flexure segment 103. These two segments are attached to one another using wafer attachment techniques, and each segment cooperates in providing bi-directional movement of the transducer body 42 with respect to the magnetic medium surface 52. The motor segment 102 is interposed between the flexure segment 103 and the slider body 32, and a portion of the motor segment is attached to a portion of the slider body forming the cavity 72. As its name suggests, the motor segment 102 includes various components that provide a motive force for bi-directionally moving the transducer body 42, as will be described.

In contrast to the motor segment 102, the flexure segment 103 of the present embodiment facilitates movement of the transducer body 42 in response to the motive force provided by the motor segment. As such, the flexure segment 103 generally includes interconnect regions 104, flexure assemblies 106, and a body portion 108. The interconnect regions 104, apart from providing surfaces for the mutual physical attachment of the flexure segment 103 to the motor segment 102, also assists in facilitating electrical connectivity between the transducer 43 and the slider body 32, via the motor segment. As such, each interconnect region 104 is positioned as to electrically connect with a plurality of electrical interconnects on the motor segment 102, as will be described.

The body portion 108 of the flexure segment 103 serves as a mount for the transducer body 42, as has been discussed. Thus, though the cavity 70 in which the transducer body 42 is positioned is defined by both the body portion 108 of the flexure segment 103 and the slider body 32, the transducer body is attached to the portion of the body portion 108 that contributes in defining the cavity.

Figure 1D:
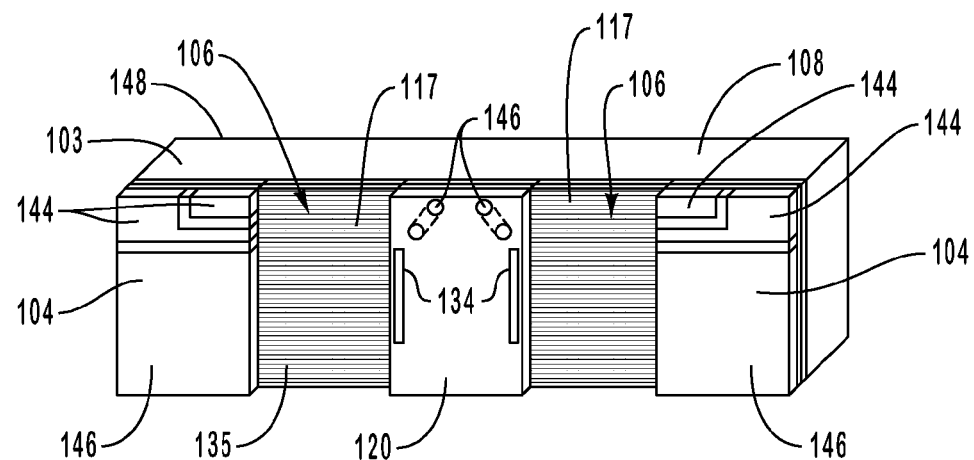
FIG. 1D is a cross sectional view of the recording head of FIG. 1A, taken along the line 1D-1D.

The body portion 108 is indirectly attached to each interconnect region 104 via the flexure assemblies 106. The flexure assemblies 106 each include a plurality of resilient flexure beams 117, as shown in FIG. 1D, that can deform when subjected to a sufficient force, such as the motive force provided by the motor segment 102. The flexure beams 117 of each flexure assembly 106 are configured such that their deformation causes movement of the body portion 108 and transducer 43 in specified directions with respect to the magnetic medium surface 52. In one embodiment, flexure of the flexure assemblies 106 results in selective transducer motion in a vertical, fly height direction, which corresponds to micropositioning movement along the z-axis shown in FIG. 15, and/or in a horizontal, "track-to-track" direction, which corresponds to movement along the x-axis. More details regarding operation and manufacture of the flexure assemblies 106 can be found in U.S. patent application Ser. No. 10/794,482, filed Mar. 5, 2004, entitled "Integrated Recording Head Micropositioner Using Off-Axis Flexure Bending" (the "'482 application"), which is incorporated herein by reference in its entirety.

Figure 1E:
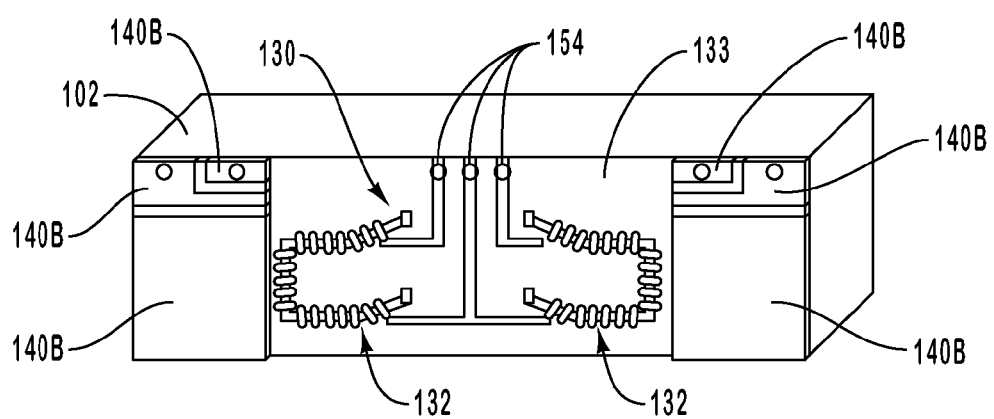
FIG. 1E is a cross sectional view of the recording head of FIG. 1A, taken along the line 1E-1E.

Together with FIGS. 1A-1C, particular reference is now made to FIGS. 1D and 1E in describing various details regarding the motor segment 102 and the flexure segment 103. The motor segment 102 includes a motor 130 to provide the force needed to enable the flexing of the flexure assemblies 106 of the flexure segment 103 and corresponding micropositioning movement of the transducer 43. The motor 130 in the illustrated embodiment includes two toroidal coils 132 that are positioned at an inner face 133 of the motor segment 102. Correspondingly, two closure bars 134 are positioned at an inner face 135 of the flexure segment 106 such that the ends of each closure bar align with the ends of the respective toroidal coil 132. In addition to this configuration, other configurations and structures can be included in the motor 130.

Each toroidal coil 132 is shown in FIG. 1E to have a specified shape. The toroidal coils 132 are shaped in this manner to prevent interference with the operation of the transducer 43 and the read/write signals it processes during recording head operation. As such, it is appreciated that the shapes of the toroidal coils as described herein can vary according to need in a particular application, and further, the shape of each coil can differ from the other coil, if desired.

The wafer assembly 100 includes various conductive pathways to enable recording head operation. In detail, the motor segment 102 includes a plurality of contact pads 140A that are positioned on a face 141 of the motor segment such that they each align with the corresponding read signal contact pads 60B and write signal contact pads 62B located on the slider body top surface 38. As best seen in FIG. 1B, the contact pads 140A of the motor segment 102 are perpendicularly oriented with respect to the corresponding read and write signal contact pads 60B and 62B. This arrangement enables a simple connection to be made between the contact pads of the motor segment 102 and the slider body 32. This connection can be achieved in one embodiment by using a solder bond, such as a gold ball bond 143, as shown in FIG. 1B. For clarity, the gold ball bond 143 has been omitted from FIG. 1A.

The electrical connection between the read and write signal contact pads 60B, 62B and the contact pads 140A forms part of multiple conductive pathways between the slider body 32 and the transducer 43 for transmitting read and write signals to and from the transducer. These conductive pathways include the read signal paths 60 and write signal paths 62 of the slide body 32, as already described. As best seen in FIG. 1B, the read and write signal contact pads 60A and 62A of the read and write signal paths 60 and 62, respectively, are positioned on the top surface 38 of the slider body 32 to electrically connect with a flexible circuit 142 or other suitable component of the recording head 30 or magnetic storage device. To assist this connection, a solder bump can be placed on the contact pads 60A and 62A or on corresponding contact pads of the flexible circuit 142. Each of the contact pads 60A and 62A are connected by vias 60C and 62C in the slider body 32 to the corresponding contact pads 60B and 62B.

As mentioned, the contact pads 60B and 62B in the slider body 32 interconnect with the motor segment 102 via the contact pads 140A, as already explained. In turn, the contact pads 140 electrically connect with the interconnect regions 104 of the flexure segment 103 via a plurality of vias, such as laser vias 144 defined in the motor segment and contact pads 140B located on the inner surface 133, as seen in FIG. 1E. Each interconnect region 104 is physically and electrically connected to a portion of the inner surface 133 of the motor assembly 102 such that contact pads 146 on the inner surface 135 of the flexure segment 103 electrically connect with the corresponding contact pads 140B of the motor segment 102.

Some or all of the flexure beams 117 of each flexure assembly 106 are electrically conductive so as to electrically interconnect the contact pads 146 on the inner surface 135 with a plurality of vias, such as laser vias 144, that are defined through the body portion 108 of the flexure segment 103. As best seen in FIG. 1C, the laser vias 144 connect on a trailing face 148 of the flexure segment 103 to corresponding contact pads 150 using metallization leads 151. The contact pads 150 are then wire bonded (not shown) to contact pads 152 on the transducer body 43. In this way, a complete conductive path through the recording head 30 is established for transmitting read and write signals to and from the transducer 43.

Similarly, conductive paths are established through the recording head 30 for providing electrical signaling for the toroidal coils 132 of the motor 130. In detail, the motor signal path 64 defined in the slider body 32 interconnects the flexible circuit 142 with the motor segment 102 via the contact pads 64A and 64B. Again, the orientation between contact pads 64B and the corresponding contact pads 140A on the motor segment 102 is a perpendicular orientation so as to enable a gold ball solder bond or similar bonding to be used in interconnecting the contact pads. A plurality of vias 154 that are electrically connected to the contact pads 140A are defined through the motor segment 102 to connect with the motor 130 on the inner surface 133 of the motor segment, as best shown in FIG. 1E. In this way, proper electrical connectivity of the motor 130 can be supplied. In addition to the schemes described above for electrically connecting both the transducer 43 and the motor 130, other configurations can be used as may be suited for a particular application.

The recording head 30 as shown in FIGS. 1A-1E can be used to achieve bi-directional movement of the transducer body 42, and hence the transducer 43, with respect to the magnetic medium surface 52. When such movement is desired, electrical signals can be supplied to the toroidal coils 132 of the motor 130 using the conductive pathways described above. Actuation of the toroidal coils 132 by the electrical signals causes the coils to create an electromagnetic flux that attracts the closure bars 134 located in a central portion 120 of the body portion 108 of the flexure segment 103. This in turn causes bending of the flexure beams 117 of each flexure assembly 106, which in turn causes movement of the central portion 120 toward the inner surface 133 of the motor segment 102, resulting in the minimization of a gap 155 between the inner surface 133 of the motor segment and the inner surface 135 of the flexure segment 103. This movement of the central portion 120 causes corresponding movement for the rest of the body portion 108 and the transducer body 42. Because of configuration of the flexure beams 117, however, movement of the body portion 108 and transducer body 42 is directed along a vertical z-axis, a horizontal x-axis, or a combination of both axes with respect to the magnetic medium surface 52, which axes are represented in FIG. 15. Such movement of the transducer body 42 correspondingly and desirably causes similar movement of the transducer 43. In this way, fly height and track-to-track motion of the transducer 43 can be achieved with respect to the magnetic medium surface 52. Further details regarding actuation of the recording head in the manner described above can be found in the '482 application.

Figure 2A:
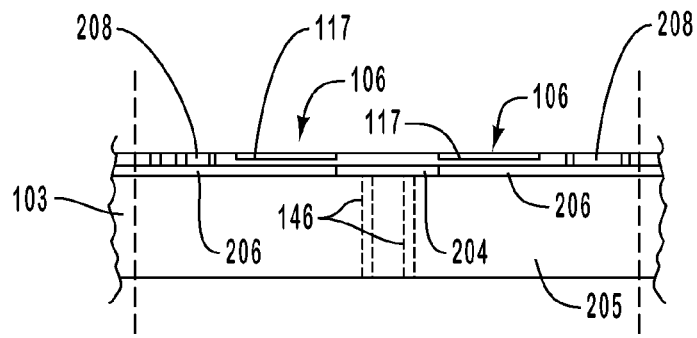
FIG. 2A is a top view showing one step in the fabrication of a recording head according to one embodiment.
Figure 2B:
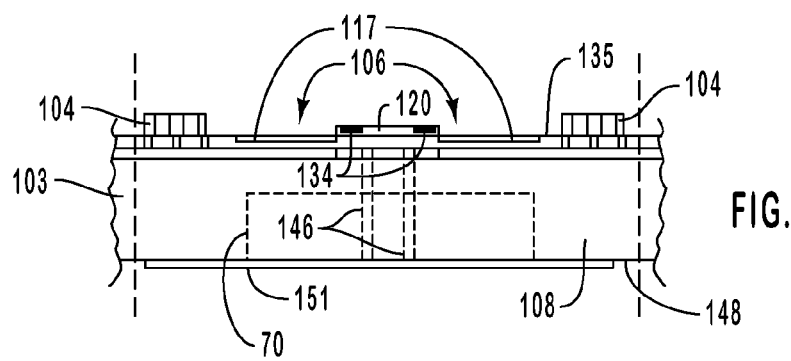
FIG. 2B is a top view showing another step in the fabrication of a recording head according to one embodiment.

Reference is now made to FIGS. 2A-2D in describing various details regarding the manufacture of the motor segment and the flexure segment of a recording head made in accordance with one embodiment of the present invention. FIGS. 2A and 2B show various steps in the manufacture of a flexure segment 103 similar to that shown in FIGS. 1A-1E. In FIG. 2A, a silicon nitride region 204 is formed atop a silicon block 205 between regions of a release layer material 206 composed of silicon dioxide. Another material layer 208 composed of polycrystalline silicon, single crystal silicon, or other suitable material is deposited atop the regions of silicon nitride 204 and silicon dioxide release layer 206, and two regions that eventually form the flexure assemblies 106 of the recording head are etched in the material layer to define the plurality of flexure beams 117. Laser vias 146 are defined through the silicon block 205. In FIG. 2B, interconnects that form a portion of the interconnect regions 104 are deposited, as well as part of the central portion 120, including two closure bars 134. The cavity 70 is defined in the silicon block 205, and metallization leads 151 on the trailing face 148 are deposited to form the flexure segment 103. In addition to these steps, other steps can be performed to complete the flexure segment 103, as may be appreciated by one skilled in the art.

Figure 2C:
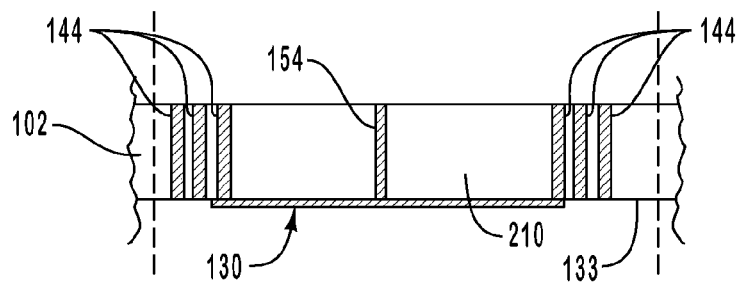
FIG. 2C is a top view showing yet another step in the fabrication of a recording head according to one embodiment.

FIG. 2C shows various steps in the manufacture of the motor segment 102. A plurality of laser vias 144 and 154 is defined in a silicon block 210. Portions of the motor 130 are then formed on the inner face 133. Again, in addition to these steps, other steps can be performed to complete the motor segment 102.

Figure 2D:
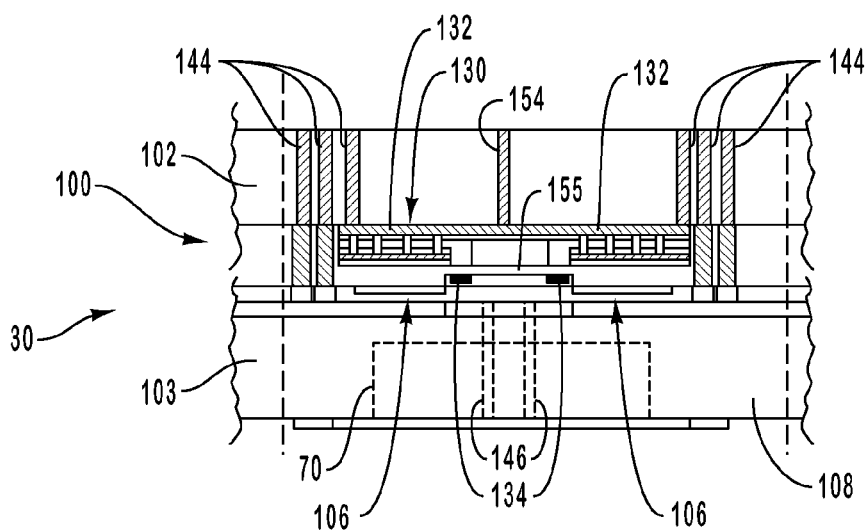
FIG. 2D is a top view showing still another step in the fabrication of a recording head according to one embodiment.

In FIG. 2D, completion of the motor 130 is performed, including positioning of a magnetic yoke and other portions of the toroidal coils 132. Then joining of the motor segment 102 and the flexure segment 103 together is performed and the interconnection of the various conductive pathways can be completed to form the wafer assembly 100. The overall width of the wafer assembly 100 in one embodiment is approximately 200 micrometers, which is a desirable reduction in size over other recording head designs. It should be appreciated that the order in which the various components are formed as described above can be altered as needed during manufacture.

Figure 3A:
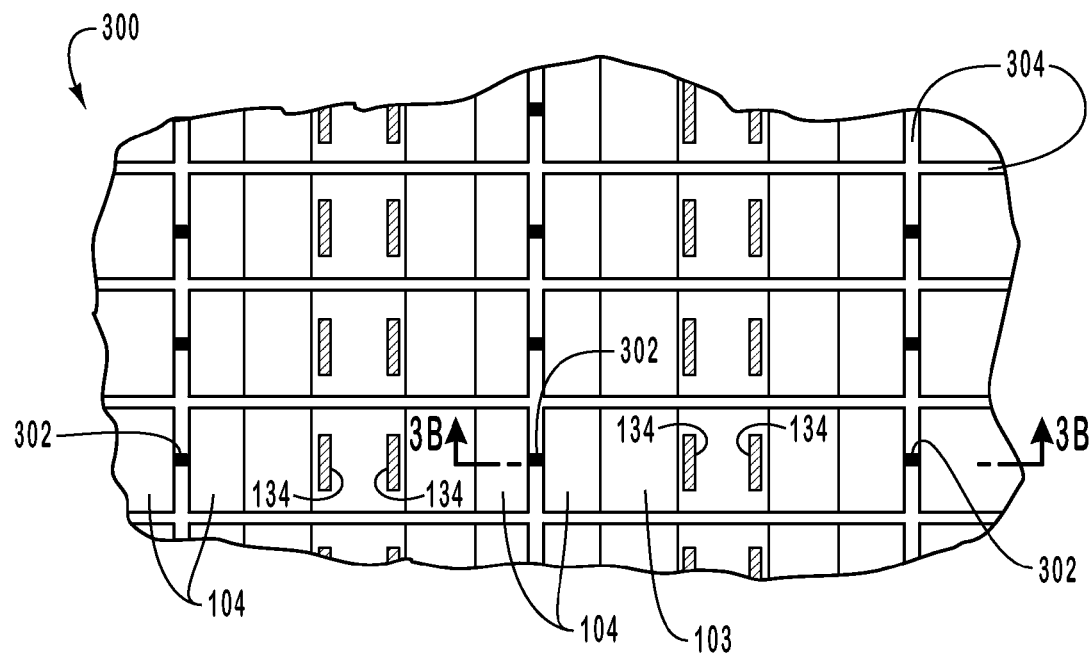
FIG. 3A is a top view of a wafer having a plurality of flexure wafer portions formed according to one embodiment.
Figure 3B:
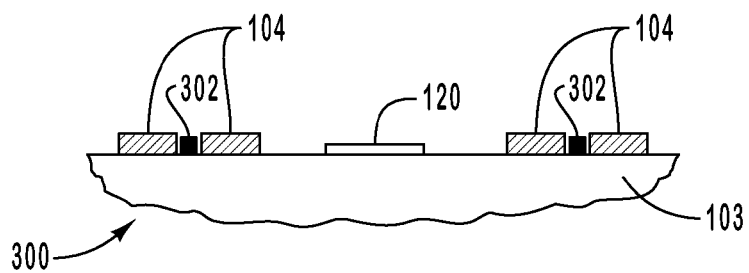
FIG. 3B is a cross sectional side view of a portion of the wafer of FIG. 3A, taken along the line 3B-3B.

Reference is now made to FIGS. 3A and 3B, which show various views of a wafer 300 having defined thereon a plurality of flexure segments 103 made in accordance with at least some of the steps outlined in connection with FIGS. 2A-2D. FIGS. 3A and 3B further show a plurality of spacers 302, composed of ceramic or other suitable material, that are deposited and positioned in between adjacent flexure segments 103 in dice lanes 304 defined in the wafer 300. The dice lanes 304 are used in guiding the separation of the flexure segments 103 from the wafer 300. Use of the spacer 302 enables a higher level of precision to be obtained when defining the size of the gap 155 (FIG. 1A) that will exist between the central portion 120 of the flexure segment 103 and the inner surface 133 (FIG. 1E) of the motor segment 102 during joining of the segments. Thus, the height of the spacers 302, which height can be precisely controlled during their formation, enables the proper amount of heat and pressure to be applied to the flexure segment 103 and motor segment 102 when the two segments are joined. The spacers 302 can be subsequently removed.

Figure 4A:
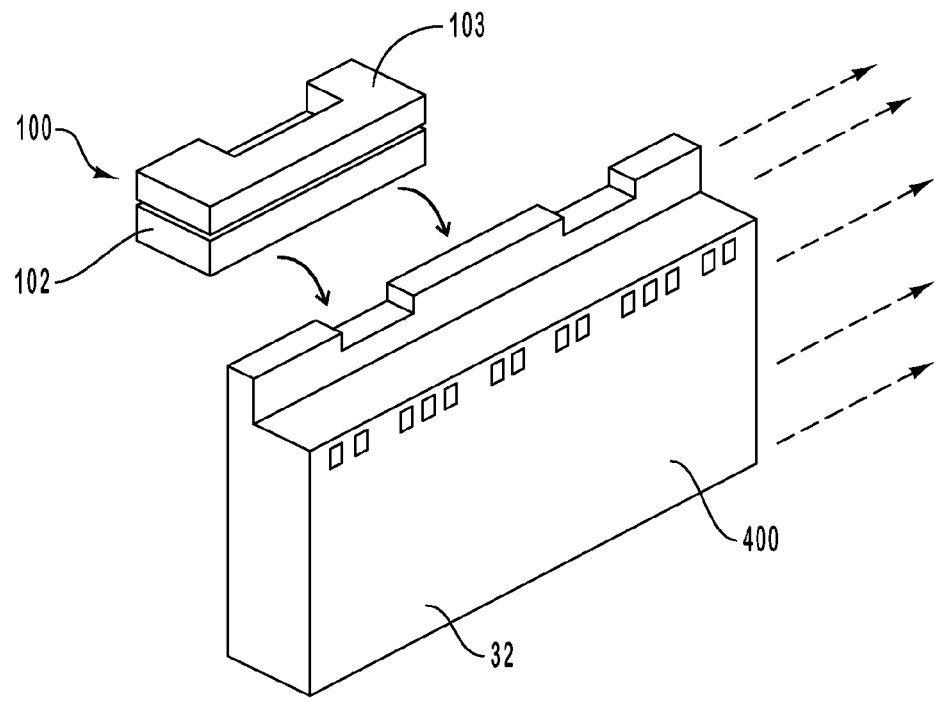
FIG. 4A is a perspective view showing one step in assembling a recording head according to one embodiment.
Figure 4B:
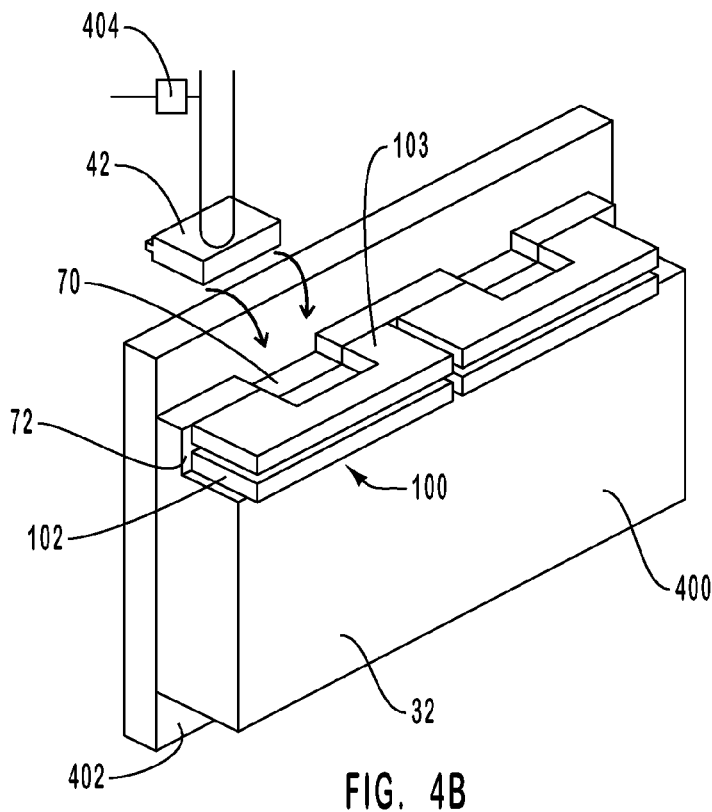
FIG. 4B is a perspective view showing another step in assembling a recording head according to one embodiment.

Reference is now made to FIGS. 4A and 4B, which depict various details regarding assembly of the components of the recording head 30 shown in FIGS. 1A-1E, according to one embodiment. FIG. 4A shows a motor segment 102 and flexure segment 103, joined according to the discussion regarding FIGS. 2A-2D. The combined segments 102 and 103 now form the wafer assembly 100 and are shown being mated to a slider body 32 that forms part of a slider body bar 400, including multiple unseparated slider bodies.

The wafer assembly 100 is mated with the respective slider body 32 such that the cavity 70 is properly defined, as in FIG. 4B. The slider body 32 is then temporarily affixed, or vacuum chucked, to a reference flat surface 402, and the transducer body 42 is precisely placed in the cavity 70 using a touch sensor 404 or other suitable apparatus. Once properly positioned, the transducer body 42 can be affixed to a portion of the flexure segment 103.

Figure 5:
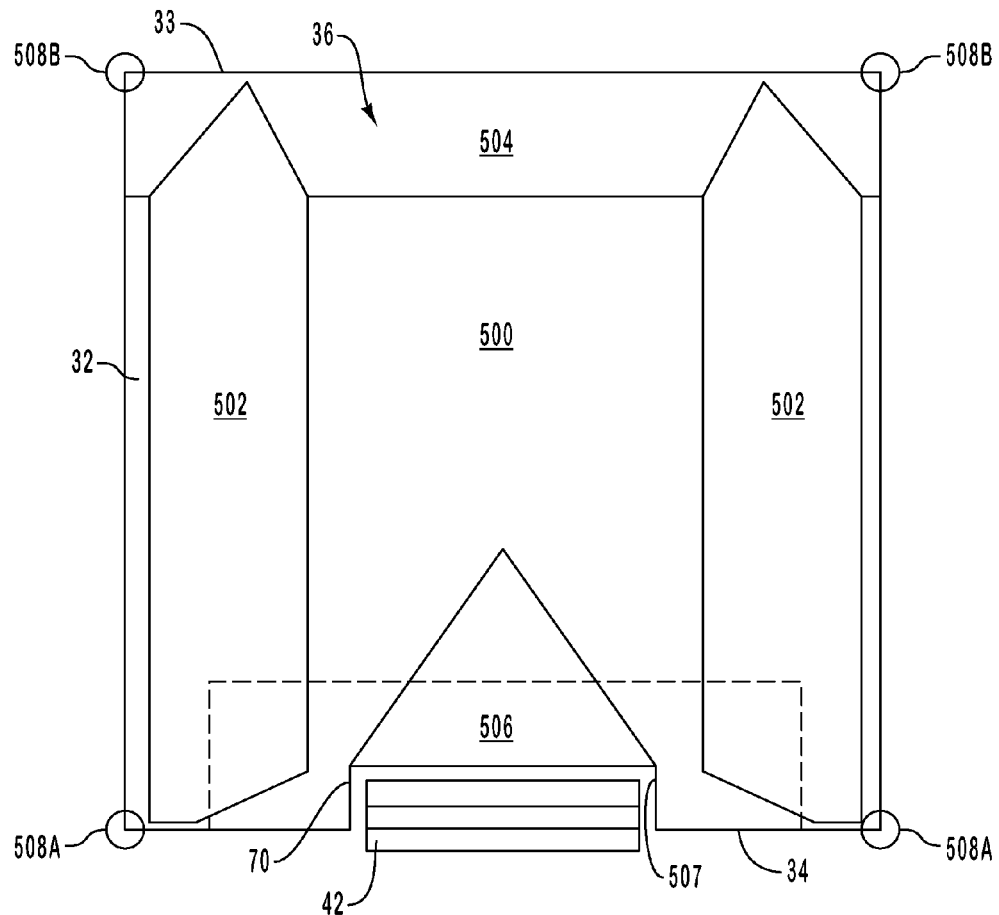
FIG. 5 is a bottom view of a recording head having various surfaces according to one embodiment.

Reference is now made to FIG. 5, which shows various features of the air bearing surface 36 of the slider body 32, according to one embodiment. As shown, the air bearing surface 36 includes features that improve the travel of the slider body 32 above the magnetic medium surface 52 (FIG. 1B) during recording head operation. A depression 500 having a floor that is substantially horizontal with respect to the magnetic medium surface 52 is defined in a central region of the air bearing surface. Two lateral ridges 502 are defined on either side of the depression 500 in an angled configuration with respect to the floor of the depression and extend between the leading surface 33 and the trailing surface 34. In addition, a step 504 is defined adjacent the leading surface 33. A debris shield 506 extending in an angled configuration from the depression 500 is defined about an opening 507 of the cavity 70. The debris shield 506 prevents an accumulation of foreign material about the transducer body 42, thereby reducing contamination of the transducer 43. In other embodiments, it is appreciated that the debris shield 506, the step 504, and the ridges 502 can have shapes, angles, and designs that vary from those explicitly shown herein in order to maximize performance of the air bearing surface 36 of the slider body 32.

FIG. 5 further shows that the configuration of the slider body 32 in one embodiment prevents damage to the transducer body 42 during shock events. In detail, the slider body 32 is designed such that, when a shock event occurs to the recording head that forces the head into contact with the magnetic medium surface 52 (FIG. 1B), one of four corners 508A and 508B of the slider body 32, and not the transducer body 42, impact the magnetic medium surface. In particular, the trailing surface 34 partially envelops the transducer body 42 to ensure that corners 508A of the slider body nearest the transducer body 42 impact the magnetic medium surface 52 before the transducer body impacts the surface, thereby preventing damage to the transducer 43.

Figure 6:
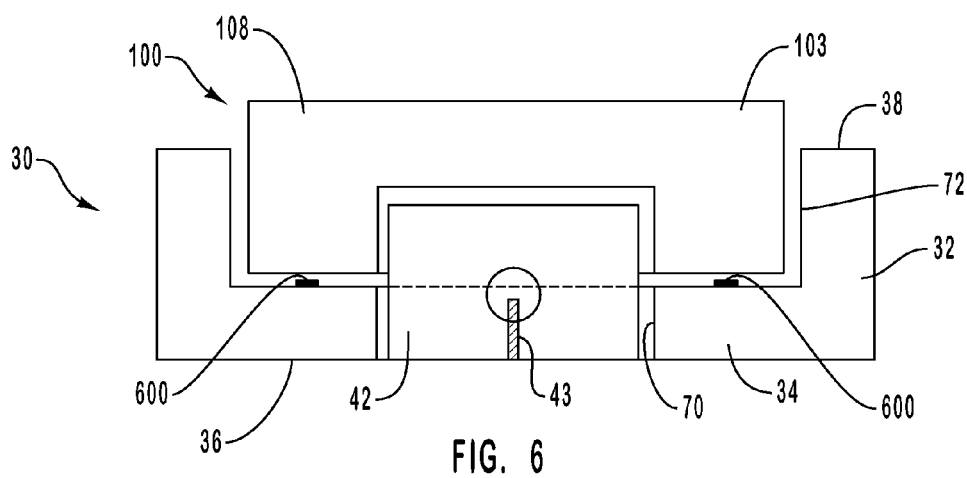
FIG. 6 is an end view of a recording head showing various displacement limiting devices according to one embodiment.

Reference is now made to FIG. 6, which shows a simplified end view of the recording head 30, according to one embodiment. As shown, the slider body cavity 72 can include a plurality of displacement limiters 600 interposed between the cavity and the mated motor segment 102/flexure segment 103. The displacement limiters 600 prevent significant unanticipated travel of the flexure segment 103 in the case of a shock event occurring to the recording head 30, thereby preventing damage to the flexure segments and/or slider body. Each displacement limiter 600 is shaped so as to minimize contact and reduce static friction between the displacement limiter and the corresponding surface of the flexure segment 103. Two, four, or more displacement limiters 600 can be located as needed on various surfaces within the cavity. Alternatively, the displacement limiters can be placed on the flexure segment 103.

Figure 7:
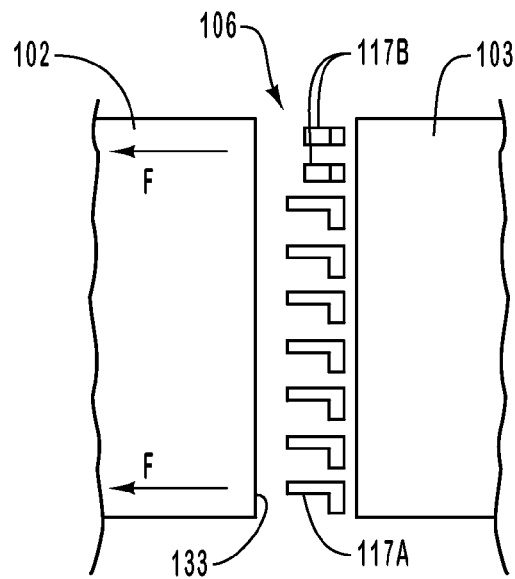
FIG. 7 is a cross sectional side view of a portion of a recording head having conductive flexures according to one embodiment.

Reference is now made to FIG. 7, which shows a portion of the motor segment 102 and the flexure segment 103 in cross section. In detail, FIG. 7 illustrates a flexure assembly 106 having flexure beams made in accordance with one embodiment of the present invention. As shown, a plurality of flexure beams 117A having an "L"-shaped cross section are formed in the flexure assembly 106 to provide off-axis bending, or bending that is not in alignment with the direction of a motive force imposed on the flexure segment 103, which directional force is shown by the arrows indicated by "F." This off-axis bending enables the bi-directional movement of the transducer, as explained above. A plurality of modified flexure beams 117B are also shown, being formed of a silicon flexure portion and a conductive portion, such as copper, gold, or other suitable metal. The flexure beams 117B are electrically conductive so as to allow read/write signals to pass through the flexures in the manner described above, in connection with FIGS. 1A-1E. Further, each flexure beam 117B has a low stiffness to minimize performance reduction due to temperature effects. Though the flexure beams 117B are shown in FIG. 7 grouped together near the top of the flexure segment 103, it is appreciated that the beams can be located in other positions within the flexure assembly, and can be distributed from one another throughout the assembly, if desired.

Figure 8:
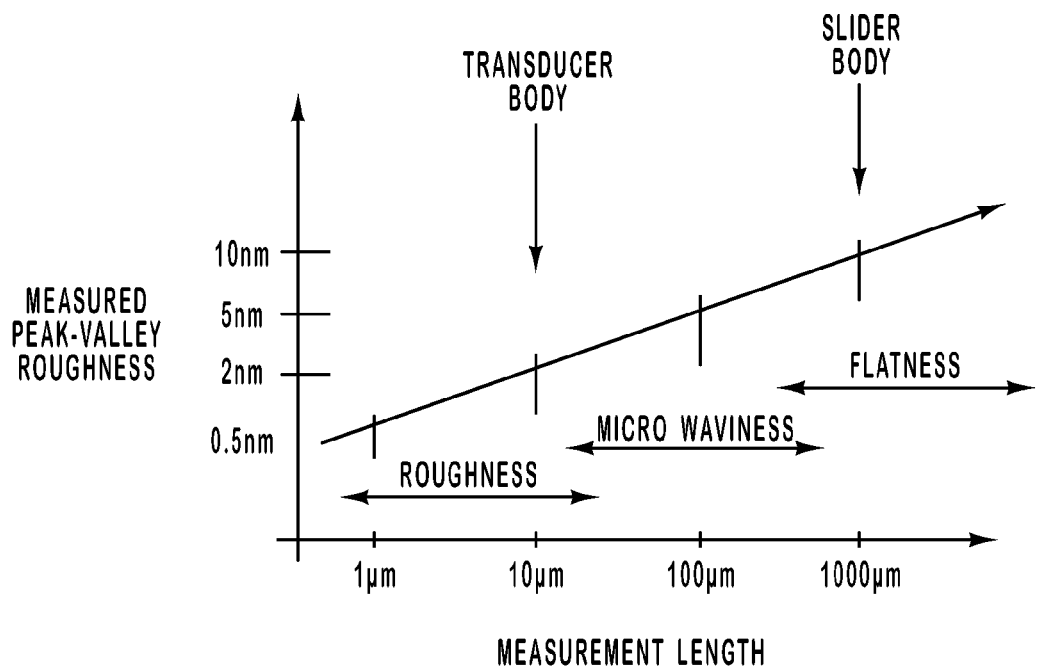
FIG. 8 is a graph showing the range of surface imperfections possible on a surface of a magnetic medium.
Figure 9:
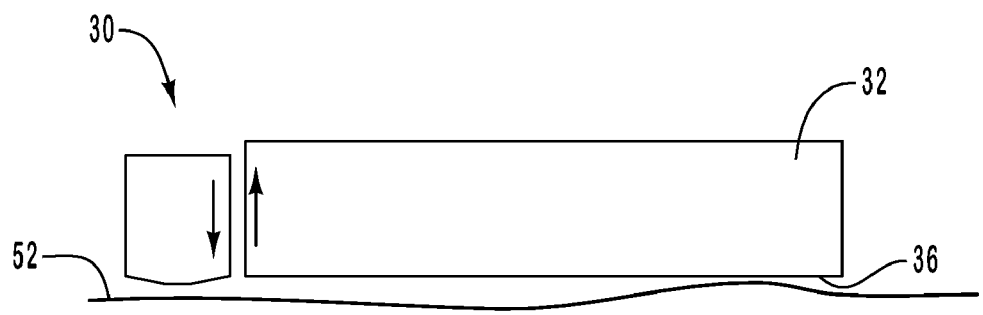
FIG. 9 is a simplified cross sectional side view of a recording head passing over imperfections on a surface of a magnetic medium.

Reference is now made to FIGS. 8 and 9. FIG. 8 depicts a graph showing the relative ranges of surface defects in terms of both height and length. As shown, flatness surface defects having a length on the order of 1,000 micrometers can be sensed and adjusted for by a slider body given that a slider body has a typical length on the order of 1,000 micrometers. In contrast, microwaviness surface defects having a length on the order of less than 1,000 micrometers, such as 100 micrometers, can only be sensed by a transducer body in one embodiment given that the length of a transducer body is substantially less than that of a slider body.

FIG. 9 shows how one embodiment of the present invention can take advantage of the relationship described in FIG. 8. In particular, FIG. 9 shows the slider body 32 of the recording head 30 passing over a 500 micrometer defect on the magnetic medium surface 52. Because of the relatively small size of the defect, the slider body 32 has minimal fly height response to the defect, which can otherwise result in an undesirable separation between the recording head 30 and the magnetic medium surface 52.

In contrast, the transducer body 42 as described in the embodiments above is independently movable in the fly height direction with respect to the slider body 32 because of the flexure assemblies 106 of the flexure segment 103 (FIGS. 1A-1E). Thus, when it encounters the surface defect shown in FIG. 9, the transducer body 42 can adjust its position in the vertical fly height direction in order to desirably maintain a constant separation between the transducer 43 and the magnetic medium surface 52.

Figure 10A:
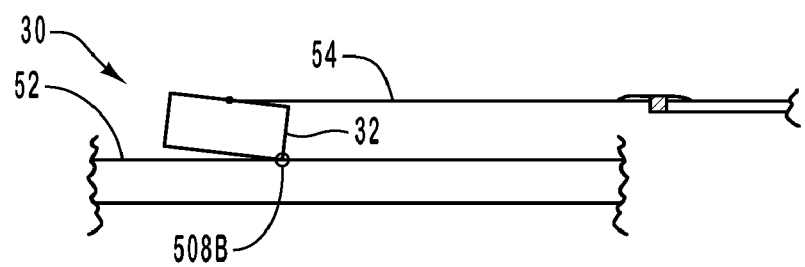
FIG. 10A is a simplified side view of an impact event between a recording head and a surface of a magnetic storage medium.
Figure 10B:
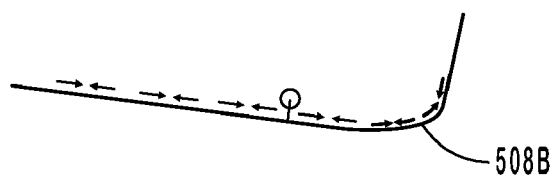
FIG. 10B is a close-up view of a portion of the recording head of FIG. 10A during the impact event.

Reference is now made to FIGS. 10A and 10B, which depict various features of a recording head having shock event protection features, according to one embodiment. FIG. 10A illustrates the configuration of a recording head shock event wherein the recording head 30 impacts the magnetic medium surface 52 in response to a violent shaking or jarring force. As shown, this typically results in one of the corners, typically one of the corners 508B, of the slider body 32 impacting a portion of the magnetic medium surface 52.

FIG. 10B illustrates various features of the recording head 30 that are designed to minimize the effects of shock events, such as that shown in FIG. 10A, according to one embodiment. In detail, each corner 508A, 508B of the slider body 32 that is susceptible to inadvertently impacting the magnetic medium surface 52 is modified to lessen the damage to the recording head upon striking the magnetic medium surface 52. First, the corner 508A, 508B is rounded so as to lessen the force imparted to the slider body 32 during the impact. Second, compressive stresses are introduced into sub-layers of the slider body 32 in order to retard the growth of any cracks that are created in the slider body as a result of impact.

Figure 11A:
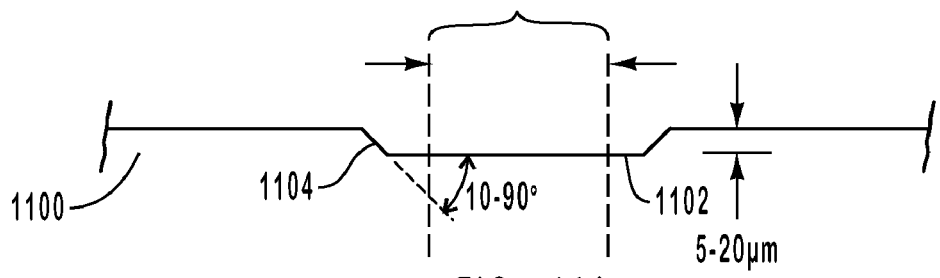
FIG. 11A is a cross sectional view showing one step in the manufacture of a slider body according to one embodiment.
Figure 11B:
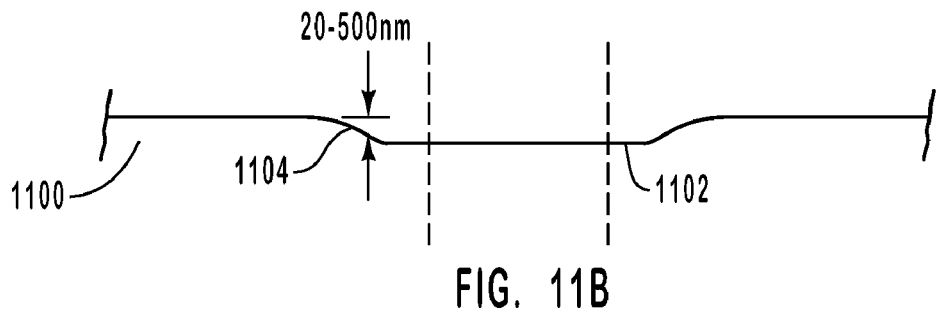
FIG. 11B is a cross sectional view showing another step in the manufacture of a slider body according to one embodiment.
Figure 11C:
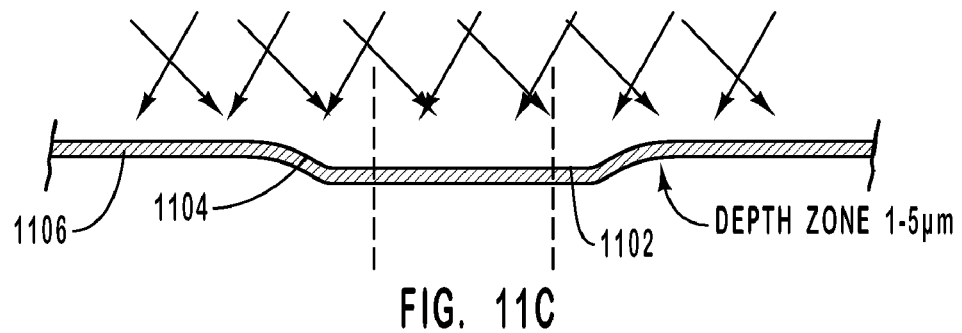
FIG. 11C is a cross sectional view showing yet another step in the manufacture of a slider body according to one embodiment.
Figure 11D:
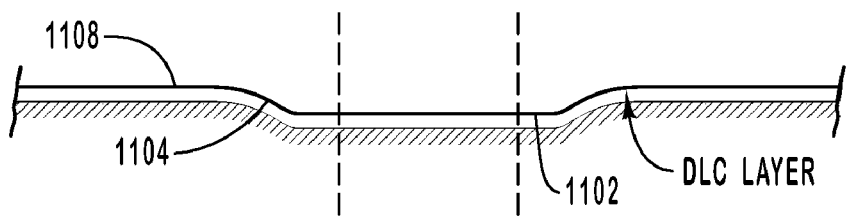
FIG. 11D is a cross sectional view showing still another step in the manufacture of a slider body according to one embodiment.

Reference is now made to FIGS. 11A-11D in describing a method of manufacturing the slider body 32 to impart the qualities described in FIG. 10B. First, a wafer 1100, on which a plurality of slider bodies 32 will be manufactured, is processed to form a plurality of dice lanes 1102 that will be used to guide the separation of adjacent slider bodies. Each dice lane 1102 is approximately 5-20 micrometers in depth and is defined slightly wider (approximately 25-75 micrometers) than the width of the cut that will eventually separate adjacent slider bodies 32. The walls 1104 of the dice lanes 1102 are angled to fall within a range between about 10 degrees to about 90 degrees, as shown in FIG. 11A. Then a polishing process, such as a CMP process, is followed, which results in rounding the walls 1104, as shown in FIG. 11B, such that the walls possess a roll-off of approximately 20-500 nanometers. An ion implantation process is then performed, wherein carbon atoms or other suitable elements are implanted to create a mixed material sub-surface layer 1106 below the slider body surface 32 to a depth of approximately one to five micrometers, as shown in FIG. 11C. Then a diamond-like carbon layer 1108 is applied over the slider body surface, as shown in FIG. 11D, to a depth of approximately 200 to 400 angstroms.

The result of the above process is a slider body having corners 508A, 508B that are rounded and a slider body surface having a sub-surface with compressive residual stress sufficient to deter crack formation and related damage in the case of a shock event. Further, the mixed material subsurface sub-surface layer 1106, which in one embodiment is composed of silicon carbide, creates a material discontinuity that helps retard crack growth if cracks do indeed form as a result of the shock event.

Figure 12:
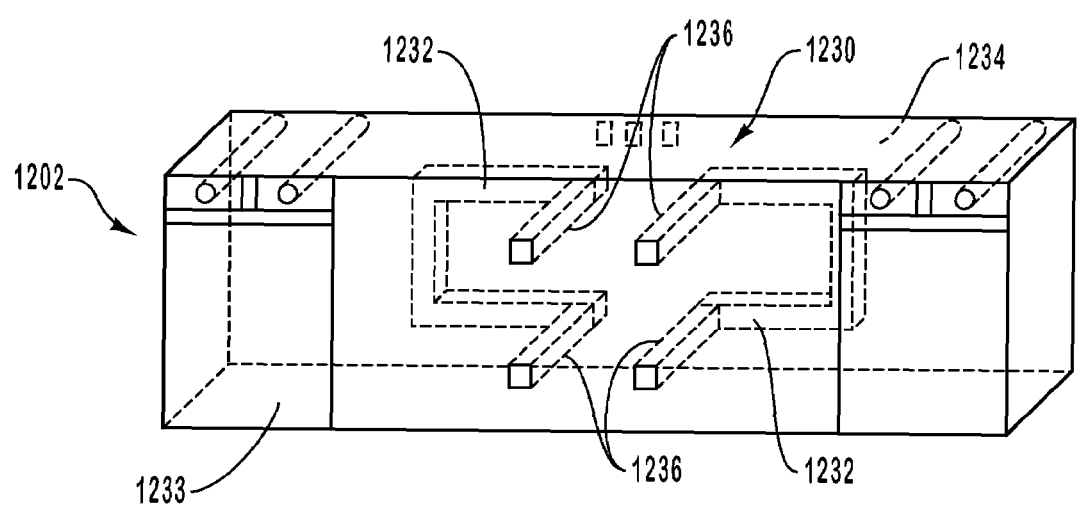
FIG. 12 is a perspective view of a recording head according to another embodiment of the present invention.
Figure 13:
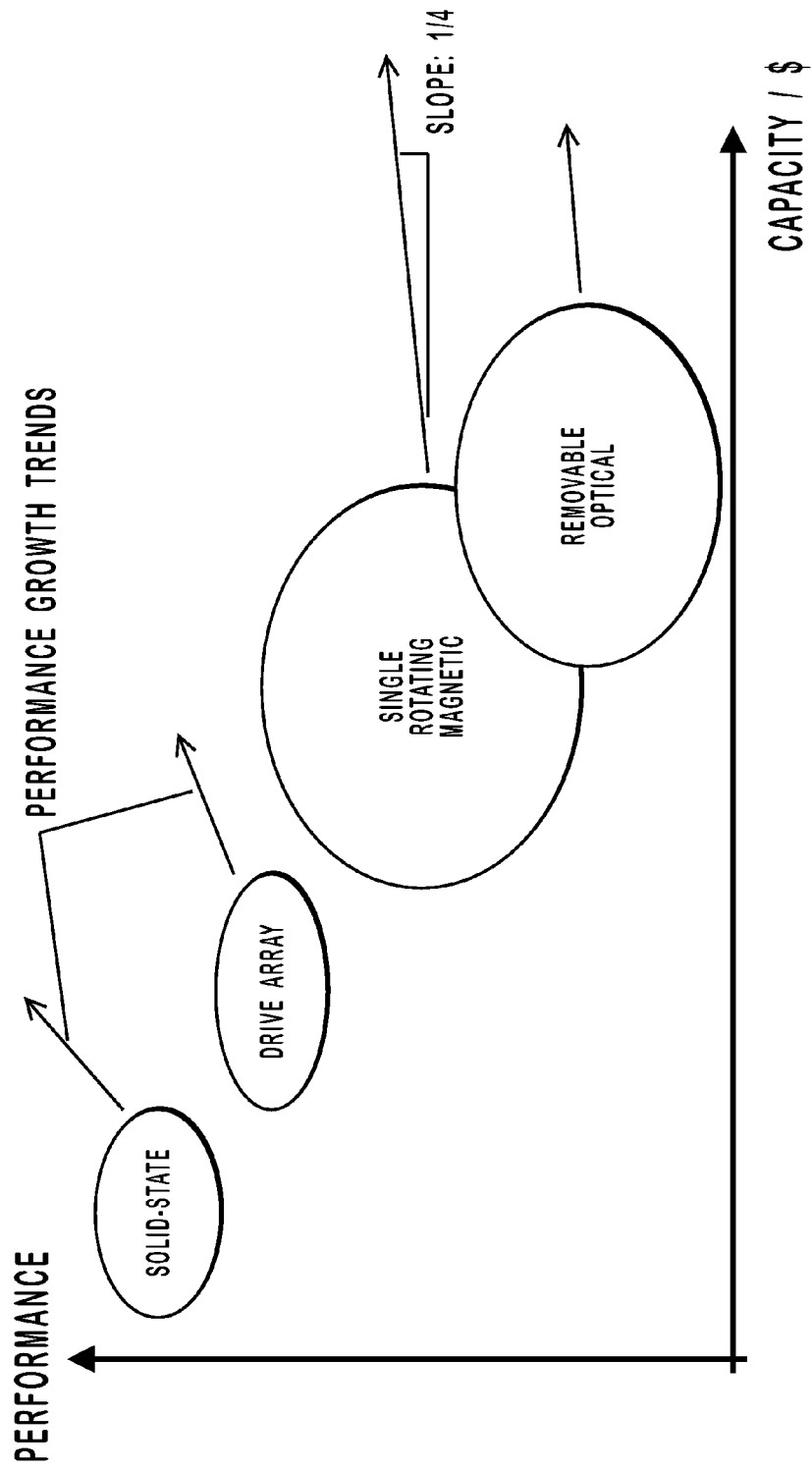
FIG. 13 is a graph that depicts relative cost and performance values of conventional data storage device technologies.

Reference is now made to FIG. 12, which depicts a motor segment, made in accordance with one embodiment of the present invention, for use in a wafer assembly of a recording head, such as the recording head 30 shown in FIGS. 1A-1E. In detail, FIG. 12 shows a motor segment 1202 having a motor 1230. In contrast to the motor 130 shown in FIG. 1E, toroidal coils 1232 are not located on an inner face 1233 facing the flexure segment (not shown), but rather are located on an opposite face 1234 that is adjacent the slider body (not shown). Vias 1236 connected to each end of the toroidal coils 1232 extend through the motor segment 1202 and terminate on the inner face 1233. The vias can be composed of permalloy or other suitable material. So configured, the magnetic flux provided by the toroidal coils 1232 can be conveyed to the inner face 1233 by the vias 1236 during operation, thereby attracting the closure bars (not shown) located in the flexure segment and causing corresponding movement of the transducer body, as described in previous embodiments. This design can be used, for instance, where a further reduction in electromagnetic interference in the read and write signal paths is desired.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A recording head for use in a magnetic storage device having a rotating magnetic medium, comprising:
    a slider body attached to a head gimbal assembly, the slider body defining a first cavity;
    a wafer assembly positioned in the first cavity, the wafer assembly including a first segment having a motor and a second segment at least partially defining a second cavity, the second segment including a body portion and an interconnect region, the second segment further including a plurality of flexures that deform when acted upon by a force provided by the motor, the plurality of flexures connected between the body portion and the interconnect region; and
    a transducer body including a transducer and connected with the body portion of the second segment, the transducer body at least partially positioned in the second cavity of the second segment such that deformation of the flexures of the second segment causes the transducer to be moved in a vertical direction and a horizontal direction with respect to a surface of a magnetic medium.

2. A recording head as defined in claim 1, wherein deformation of the flexures causes off axis bending such that the transducer is displaced in the vertical direction and the horizontal direction.

3. A recording head as defined in claim 1, wherein the second cavity is defined by the second segment and the slider body.

4. A recording head as defined in claim 1, wherein the slider body comprises one or more corners that contact the magnetic medium surface before the transducer body when a shock event is encountered by the recording head.

5. A recording head as defined in claim 1, wherein at least some of the flexures have an "L"-shaped cross section.

6. A recording head as defined in claim 1, further comprising a plurality of displacement limiters that are positioned between the second segment and the slider body to limit movement of the second segment when a shock event is encountered by the recording head.

7. A recording head as defined in claim 1, wherein a bottom surface of the slider body defines a plurality of air bearing features.

8. A recording head as defined in claim 1, wherein a cavity opening in communication with the second cavity is defined on the bottom surface of the slider body, and wherein a debris shield is formed on the bottom surface about the cavity opening to prevent the accumulation of debris proximate the transducer that is at least partially positioned in the second cavity.

9. A recording head as defined in claim 1, wherein the transducer body is movable with respect to the surface of the magnetic medium such that it is responsive to surface defects in the magnetic medium surface having a size less than 1,000 micrometers.

10. A recording head for use in magnetic storage device having a rotating magnetic medium, comprising:
    a slider body defining a first cavity;
    a wafer assembly partially positioned in the first cavity, including:
        a first segment having a motor;
        a second segment including:
            first and second interconnect regions, the first and second interconnect regions connected to the first segment;
            a body portion having a central portion located between the first and second interconnect regions, the body portion defining a second cavity;
            first and second flexure assemblies that interconnect the first and second interconnect regions with the central portion, wherein deformation of the first and second flexure assemblies in response to a force provided by the motor causes the body portion to selectively move in a first direction and a second direction; and
        a transducer body having a transducer, the transducer body being affixed to the body portion such that the transducer is selectively moved in the first and second direction with respect to the surface of a magnetic medium when the body portion is moved by the deformation of the first and second flexure assemblies.

11. A recording head as defined in claim 10, wherein a plurality of conductive pathways is defined between the slider body and the transducer, the conductive pathways passing through the first and second segments.

12. A recording head as defined in claim 11, wherein a portion of the conductive pathways is established between the slider body and the first segment via a first contact pad on the first segment and a second contact pad on the slider body, the first and second contact pads oriented in an angled configuration with respect to one another, wherein the first and second contact pads are electrically interconnected.

13. A recording head as defined in claim 12, wherein the first and second contact pads are angled perpendicularly with respect to one another and are electrically interconnected via a ball bond.

14. A recording head as defined in claim 12, wherein a portion of the conductive pathways is defined between the first segment and the second segment via the interconnect regions.

15. A recording head as defined in claim 14, wherein each flexure assembly further includes a plurality of resilient flexure beams that each interconnect the respective interconnect region with the central portion.

16. A recording head as defined in claim 15, wherein a portion of the conductive pathways is defined through the second segment from each interconnect region to the central portion via at least some of the flexure beams of each flexure assembly.

17. A recording head as defined in claim 16, wherein at least some of the flexure beams are composed of silicon and include a metallized portion that enables the flexure beams to be electrically conductive.

18. A recording head as defined in claim 11, wherein the motor includes first and second toroidal coils.

19. A recording head as defined in claim 18, wherein the central portion of the second segment includes at least two closure bars that are magnetically attracted to the first and second toroidal coils during operation of the motor.

20. A recording head as defined in claim 19, wherein the first and second toroidal coils are positioned on a surface of the first segment that is adjacent the second segment.

21. A recording head as defined in claim 19, wherein the first and second toroidal coils are positioned on a surface of the first segment that is adjacent the slider body, and wherein a plurality of vias are defined through the first segment to impart an electromagnetic flux to the at least two closure bars.

22. A recording head as defined in claim 18, wherein the first and second toroidal coils are shaped as to prevent electromagnetic interference with the conductive pathways that are defined through a portion of the first segment.

23. A recording head as defined in claim 10, wherein a gap existing between the central portion and a surface of the first segment that is adjacent the central portion is defined during the manufacture of the recording head using at least one ceramic spacer that is positioned proximate at least one of the interconnect regions, the first segment being defined on the surface of a wafer during the manufacture of the recording head.

24. The recording head as defined in claim 10, wherein deformation of the first and second flexure assemblies each have a shape that provides off-axis bending.

* * * * *